(12) United States Patent
Gabbard et al.

(10) Patent No.: US 12,723,899 B2
(45) Date of Patent: Sep. 1, 2026

(54) STAND FOR LASER PROJECTION TOOL

(71) Applicant: Milwaukee Electric Tool Corporation, Brookfield, WI (US)

(72) Inventors: Benjamin D. Gabbard, Milwaukee, WI (US); Adam J. Sargis, Mount Pleasant, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 16 days.

(21) Appl. No.: 18/798,214

(22) Filed: Aug. 8, 2024

(65) Prior Publication Data

US 2024/0393150 A1 Nov. 28, 2024

Related U.S. Application Data

(63) Continuation of application No. 17/877,396, filed on Jul. 29, 2022, now Pat. No. 12,085,415, which is a (Continued)

(51) Int. Cl.
*F16M 11/38* (2006.01)
*F16M 11/24* (2006.01)
(Continued)

(52) U.S. Cl.
CPC ........... *G01D 11/30* (2013.01); *F16M 11/247* (2013.01); *F16M 2200/08* (2013.01); *G01C 5/00* (2013.01)

(58) Field of Classification Search
CPC .. G01D 11/30; F16M 11/247; F16M 2200/08; F16M 11/245; F16M 11/34; F16M 11/36; G01C 5/00
See application file for complete search history.

(56) References Cited

U.S. PATENT DOCUMENTS 1,863,761 A 6/1932 Neuwirth
2,668,682 A 2/1954 Dalton
(Continued)

FOREIGN PATENT DOCUMENTS

CN 2540551 3/2003
CN 201083945 7/2008
(Continued)

OTHER PUBLICATIONS

International Search Report and Written Opinion for International Search Report for PCT/US2022/037156, dated Oct. 31, 2022, 11 pages.

*Primary Examiner* — Amy J. Sterling
(74) *Attorney, Agent, or Firm* — Reinhart Boerner Van Deuren s.c.

(57) ABSTRACT

Various designs for a stand for a laser projection device including feet capable of being used in indoor and outdoor environments and the leg retention devices to lock legs of the stand together are shown. In one example, the stand includes feet with a rotatable spike structure that can be implanted in soft environments outdoors and hidden to protect indoor flooring. In another example the stand includes a leg retention device including a clip to clamp or hold the legs of the stand together in a closed position. In another example, a leg retention device including detents are used to hold the legs of the stand together in a closed position.

17 Claims, 19 Drawing Sheets

Related U.S. Application Data continuation of application No. PCT/US2022/037156, filed on Jul. 14, 2022.

(60) Provisional application No. 63/222,197, filed on Jul. 15, 2021.

(51) Int. Cl.
*G01D 11/30* (2006.01)
*G01C 5/00* (2006.01)

(56) References Cited

U.S. PATENT DOCUMENTS

| | | | | |
|---|---|---|---|---|
| 3,051,425 | A | 8/1962 | Homrighausen | |
| 3,589,757 | A | 6/1971 | Mooney | |
| 3,963,207 | A | 6/1976 | Guasti | |
| 4,015,806 | A | 4/1977 | Cattermole | |
| 4,455,005 | A | 6/1984 | Mooney | |
| 4,522,361 | A | 6/1985 | Mooney | |
| 4,767,090 | A * | 8/1988 | Hartman | F16M 11/22 396/428 |
| 4,940,203 | A | 7/1990 | Hayakawa | |
| 5,253,833 | A | 10/1993 | Indou | |
| 6,631,877 | B1 | 10/2003 | Crain et al. | |
| 6,688,566 | B1 | 2/2004 | Crain et al. | |
| 6,702,482 | B2 | 3/2004 | Sherwin | |
| 6,708,831 | B1 * | 3/2004 | Balassi | A61H 3/0244 135/65 |
| 6,829,857 | B1 | 12/2004 | Houtsma | |
| 6,942,187 | B2 | 9/2005 | Blackburn | |
| 7,543,784 | B2 | 6/2009 | Lindsay | |
| 7,604,208 | B2 | 10/2009 | Tacklind | |
| 7,654,494 | B2 | 2/2010 | Cartoni et al. | |
| 8,047,498 | B1 | 11/2011 | Karty | |
| 8,292,240 | B2 | 10/2012 | Hein et al. | |
| 8,317,141 | B2 | 11/2012 | Fischer | |
| 8,534,620 | B2 | 9/2013 | Zierer et al. | |
| 8,959,822 | B2 | 2/2015 | Kleppe | |
| 9,004,419 | B2 | 4/2015 | Nakatani | |
| 9,675,146 | B1 | 6/2017 | Howell | |
| 10,047,899 | B2 | 8/2018 | Guest et al. | |
| 10,247,353 | B1 | 4/2019 | Chen | |
| 10,309,581 | B2 | 6/2019 | Underwood | |
| 10,330,246 | B2 | 6/2019 | Rosskopf et al. | |
| D916,174 | S | 4/2021 | Gong et al. | |
| D916,175 | S | 4/2021 | Gong et al. | |
| 10,996,017 | B2 | 5/2021 | Amaral | |
| 11,339,916 | B2 * | 5/2022 | Smith | F16M 11/10 |
| 11,761,575 | B1 | 9/2023 | Stabler | |
| 2005/0109898 | A1 | 5/2005 | Hsieh | |
| 2006/0086871 | A1 | 4/2006 | Joseph et al. | |
| 2010/0003026 | A1 | 1/2010 | Kleppe | |
| 2011/0031358 | A1 * | 2/2011 | Fischer | F16M 11/36 248/168 |
| 2017/0370517 | A1 * | 12/2017 | Underwood | F16B 7/105 |
| 2019/0390819 | A1 | 12/2019 | Underwood | |
| 2020/0080682 | A1 | 3/2020 | Karman et al. | |
| 2020/0166340 | A1 | 5/2020 | Hinderling | |
| 2021/0010637 | A1 | 1/2021 | He et al. | |
| 2021/0190261 | A1 * | 6/2021 | Warner | F16M 11/16 |

FOREIGN PATENT DOCUMENTS

| | | | |
|---|---|---|---|
| CN | 201487510 | | 5/2010 |
| CN | 201487511 | | 5/2010 |
| CN | 206460246 | | 9/2017 |
| CN | 105782674 | | 10/2017 |
| CN | 107965655 | | 4/2018 |
| CN | 207298301 | | 5/2018 |
| CN | 207317791 | | 5/2018 |
| CN | 207661367 | | 7/2018 |
| CN | 108386675 | | 8/2018 |
| CN | 207864978 | | 9/2018 |
| CN | 208804427 | | 4/2019 |
| CN | 106969745 | | 6/2019 |
| CN | 208997585 | | 6/2019 |
| CN | 110411410 | | 11/2019 |
| CN | 209743971 | | 12/2019 |
| CN | 209977650 | | 1/2020 |
| CN | 111156390 | | 5/2020 |
| CN | 111271575 | | 6/2020 |
| CN | 111425717 | | 7/2020 |
| CN | 211289293 | | 8/2020 |
| CN | 211317275 | | 8/2020 |
| CN | 111678007 | | 9/2020 |
| CN | 211551007 | | 9/2020 |
| CN | 211574669 | | 9/2020 |
| CN | 211624752 | | 10/2020 |
| CN | 211976424 | | 11/2020 |
| CN | 212131900 | | 12/2020 |
| CN | 212156496 | U | 12/2020 |
| CN | 212338779 | | 1/2021 |
| CN | 212361327 | | 1/2021 |
| CN | 212408158 | | 1/2021 |
| CN | 212537331 | | 2/2021 |
| CN | 212539179 | | 2/2021 |
| CN | 112524423 | A | 3/2021 |
| CN | 212840306 | | 3/2021 |
| CN | 212840485 | | 3/2021 |
| CN | 109340543 | | 4/2021 |
| CN | 109404705 | | 4/2021 |
| CN | 212869192 | | 4/2021 |
| CN | 213018663 | | 4/2021 |
| CN | 213333333 | | 6/2021 |
| DE | 8132882 | | 4/1982 |
| DE | 3902828 | | 8/1990 |
| DE | 20117113 | | 2/2002 |
| DE | 102008045183 | | 2/2010 |
| DE | 202010014702 | | 2/2011 |
| DE | 102010013146 | | 2/2014 |
| DE | 202014102815 | | 7/2014 |
| JP | 08-105743 | A | 4/1996 |
| KR | 10-2017-0110253 | A | 10/2017 |
| WO | WO0043709 | | 7/2000 |
| WO | WO06043282 | | 4/2006 |

* cited by examiner

STAND FOR LASER PROJECTION TOOL

CROSS-REFERENCE TO RELATED PATENT APPLICATIONS

The present application is a continuation U.S. patent application Ser. No. 17/877,396, filed on Jul. 29, 2022, which is a continuation of International Application No. PCT/US2022/037156, filed Jul. 14, 2022, which claims the benefit of and priority to U.S. Provisional Application No. 63/222,197, filed on Jul. 15, 2021, which are incorporated herein by reference in their entireties.

BACKGROUND OF THE INVENTION

The present invention relates generally to the field of tools. The present invention relates specifically to a stand for a laser projection device, such as a planar laser level, a rotary laser level, a point laser level, etc., that projects one or more lasers onto a work piece or work surface.

SUMMARY OF THE INVENTION

One embodiment of the invention relates to a support structure for a laser projection device. The support structure for the laser projection device includes a platform including a mount configured to securely engage the laser projection device. The support structure for the laser projection device further includes a plurality of legs, a longitudinal axis and a foot coupled to each of the plurality of legs. The plurality of legs include a first end coupled to the platform and a second end opposing the first end. The longitudinal axis extends through the platform, the plurality of legs are arranged around the longitudinal axis. A foot is coupled to the second end of each of the plurality of legs. Each foot includes a foot spike extending along the longitudinal axis, first and second opposing sides surfaces and a pin aligned with an axis of rotation. The pin is coupled to the foot spike and extends between the first and second opposing side surfaces. Each foot further includes a recess defined in a rear surface of the foot and a knob coupled to the pin. The knob is positioned along one of the first and second opposing side surfaces of the foot. The foot spike is rotatable about the axis of rotation when the knob is rotated between an extended position in which the foot spike extends beyond the second end of the leg, and a close position in which the foot spike is located within the foot.

Another embodiment of the invention relates to a stand for a laser level. The stand includes a platform, a leg including a first end coupled to the platform and a second end opposing the first end, and a longitudinal axis extending through the platform. The stand further includes a foot coupled to the leg at the second end. The foot includes a rotatable foot spike extending along the longitudinal axis, first and second opposing side surfaces, and a pin aligned with an axis of rotation. The pin is coupled to the foot spike and extends between the first and second opposing side surfaces. The foot further includes a knob coupled to the pin. The knob is positioned along one of the first and second opposing side surfaces of the foot.

Another embodiment of the invention relates to a stand for a laser level. The stand includes a platform, a plurality of legs, a longitudinal axis and a foot coupled to each of the plurality of legs. The plurality of legs include a first end coupled to the platform and a second end opposing the first end. The longitudinal axis extends through the platform and the plurality of legs are arranged around the longitudinal axis. A foot is coupled to the second end of each of the plurality of legs. Each foot includes a foot spike extending along the longitudinal axis, first and second opposing side surfaces, and a pin aligned with an axis of rotation. Each foot further includes a recess defined in a rear surface of the foot and a knob coupled to the pin. The knob is positioned along one of the first and second opposing side surfaces of the foot. The foot spike is rotatable about the axis of rotation. When a user rotates the knob in a counterclockwise direction the foot spike moves toward an extended position where a top of the foot spike extends beyond a bottom surface of the foot. When a user rotates the knob in a clockwise direction the foot spike moves toward a closed position where the foot spike is positioned within a recess of the foot.

Another embodiment of the invention relates to a stand for a laser projection device. The stand includes a plurality of legs coupled to a platform at a first end of the legs, where the platform is designed to couple to and hold a laser projection device. The stand further includes a plurality of feet coupled to each of the legs at a second end. Each foot includes a foot spike assembly including a foot spike, a pin extending along an axis, a knob and a recess. The pin extends through the foot along the axis in a generally perpendicular orientation relative to the foot spike. The foot spike is rotatable about the axis between an extended position and a closed position and moves with the rotation of the knob. The recess of the foot is sized and/or shaped to receive foot spike such that the foot spike is hidden when in the closed position. In the open, extended position, a tip of the foot spike extends beyond a bottom surface of the foot.

Another embodiment of the invention relates to a stand for a laser projection device. The stand includes a plurality of legs coupled to a platform at a first end of the legs, where the platform is designed to couple to and hold a laser projection device. The stand further includes a plurality of feet coupled to each of the legs at a second end and a leg retention assembly. The leg retention assembly includes a spring clip and a bar corresponding to the spring clip coupled to a band or collar positioned around the legs. The spring clip includes a pair of retention surfaces facing each other and positioned on either side of a gap. The bar includes a generally cylindrical portion having an outer surface and a protruding portion extending toward the spring clip coupled to the same band or collar. The spring clip is shaped to receive the generally cylindrical portion of bar within gap such that retention surfaces can clamp or hold onto the outer surface of bar, keeping the legs together.

Another specific embodiment of the invention relates to a leg retention assembly including a clip and a bar and a plate coupled to an inner surface of a leg band or collar. The plate includes an upper surface positioned at an angle relative to inner surface of the collar. The plate further includes a pair of projections extending away from the inner surface of the collar and defining a gap between the pair of projections. The clip includes a grasping or clipping portion and a body portion. The body portion of the clip couples to the plate and is positioned in the gap between projections. The clipping portion includes a pair of arms shaped to receive the bar extending away from body portion. The arms defining a space between themselves. When the stand is in a closed position, a bar on an adjacent collar is received within the space defined between the arms of the clip on a separate collar such that arms extend around the bar, securely clipping adjacent legs together.

Another specific embodiment of the invention relates to a leg retention assembly including a spring detent housing coupled to one of legs, a spring detent system and a pair of collars each having an aperture or detent capture couple to the other two legs. The spring detent housing includes an arm coupled to an inner surface of the leg collar and extending in a generally perpendicular orientation from the inner surface. The spring detent housing further includes a projection extending in a direction of an axis, where the axis is generally parallel to the inner surface. The spring detent housing projection includes a pair of cylindrical channels extending in a parallel direction relative to the axis and sized to receive the spring detent system. The spring detent system includes a spring and a ball. Each detent collar extends in a generally perpendicular orientation from the inner surface of the leg band or collar and is positioned at a position a greater distance from each foot than the distance between the arm and the foot. The detent collars each include detent capture to maintain the position of the ball, holding the legs in a closed or locked position.

Another specific embodiment of the invention relates to a leg retention assembly including an extrusion clip. The extrusion clip includes a circular channel and a clip portion with a pair of arms. The extrusion clip and specifically circular channel slidably connects to one of the round portions of leg. The extrusion clips are positioned at a top edge of the leg band or collar and fixed in position with a fastener. The clip portion and arms grasp or hold onto an adjacent round portion of a different leg in a closed or locked position.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a stand for a laser projection device, such as a rotary laser level are shown. In one embodiment, the stand is a tripod for a rotary laser level. In contrast to the stands for a laser projection device discussed herein, conventional stands may only be suitable for use in a single type of environment (e.g., indoor or outdoor). The stands discussed herein include a design for stand feet that include a rotatable pin or spike structure capable of being planted securely into a soft ground surface (e.g., soil) to provide stability for using the stand outdoors. The pin or spike structure can be rotated up and hidden within the foot for use indoors to prevent any scratching or damage to floors. In particular embodiments, the foot pin designs are easy to operate via an external knob, and in comparison to slidable or spring-deployed foot pins, Applicant believes the design shown herein provides for a robust and durable design suitable for a construction environment.

Further, in various embodiments, the stand includes one or more devices designed to hold the legs together in a closed position. In contrast to conventional methods of holding stand legs together like straps, the designs discussed herein allow a user to more easily lock and unlock the legs of the stand and provide the ability to perform the locking in a hands-free manner. In one embodiment, the legs of the stand include collars with retention clips and bars that can quickly and easily be pushed together by a user to hold the legs together. The collars are designed so that all the retention clips and bars are coupled to the collars at a consistent height so the legs can be closed consistently without a user needing to bend over to open or close the stand. The retention clips and bars for each leg are the same, allowing for easy manufacturing of the retention components.

In another embodiment, the legs of the stand include bands or collars with either a spring detent housing or a collar with a detent capture. The bands or collars are designed so that all the detent components are the same height for consistent closing of the stand without a user needing to bend over to open or close the stand. The design further allows for quick opening and closing of the legs as the detent structure is strong enough to hold the legs together but does not require so much force to open the legs that it would be difficult for a user.

In another embodiment, the legs of the stand include collars with an extrusion clip positioned above them on each leg to hold adjacent legs of the stand together. The extrusion clips are slid down a portion of the legs and positioned such that they are capable of clipping on to another leg. The clips allow for quick opening and closing of the legs as they are strong enough to hold the legs together but do not require so much force to open the legs that it would be difficult for a user.

Figure 1:
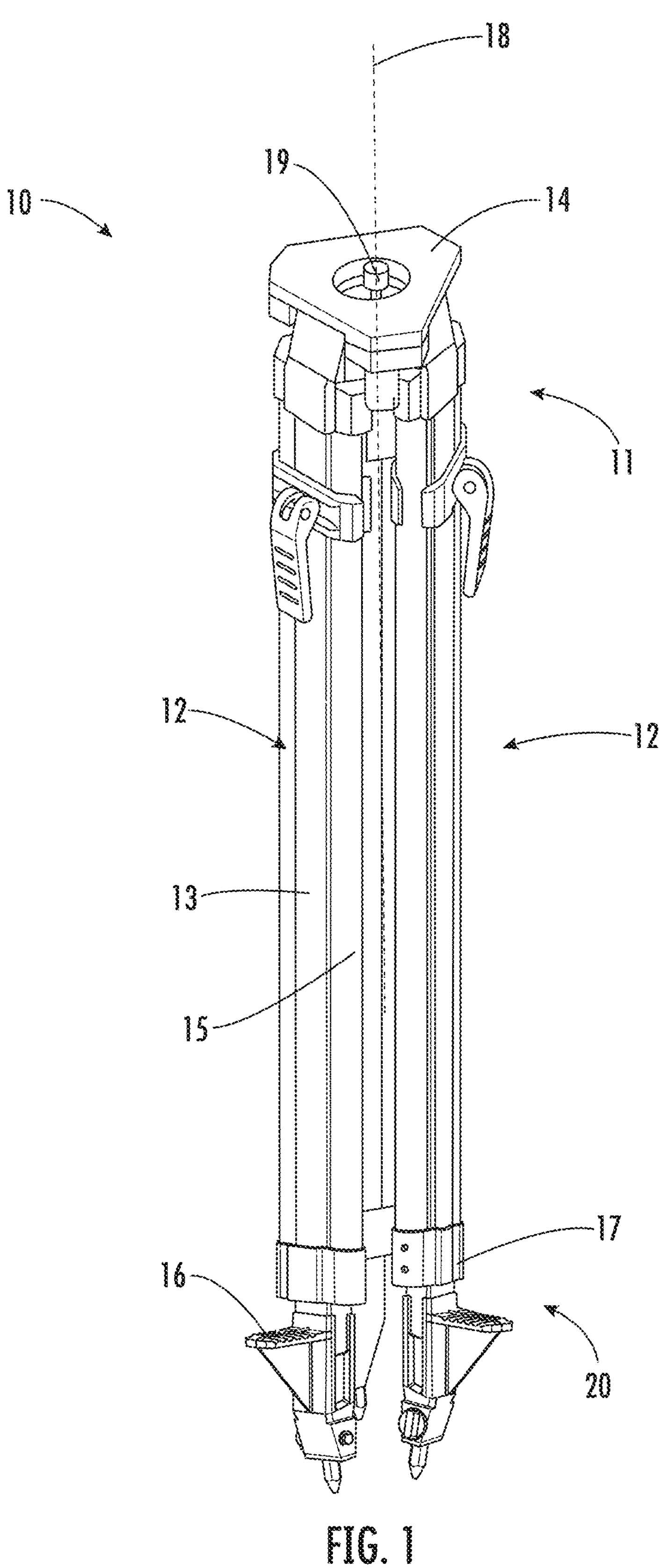
FIG. 1 is a perspective view of a tripod for a laser level, according to an exemplary embodiment.

Referring to FIG. 1, a movable structure or stand for a laser level, shown as tripod 10, is shown according to an exemplary embodiment. Tripod 10 includes legs 12, and legs 12 of tripod 10 are coupled to a platform 14 at a first end 11 of legs 12. Tools, such as laser projection tools, are coupled to platform 14 (e.g., above platform 14) to facilitate marking and/or measuring locations. In a specific embodiment, the platform 14 includes a mount configured to securely engage the laser projection tool. In a specific embodiment, a multi-axis level indicator, shown as a bullseye level vial 19 (e.g., level indicator that allows for leveling of planes in two dimensions) is coupled to platform 14 and/or within an aperture of platform 14. In general, a laser projection tool, such as a rotary laser level is rotatable about a longitudinal axis, shown as central axis 18 in a clockwise and/or counterclockwise direction. Tripod 10 further includes a plurality of feet 16 coupled to legs 12 at a second end 20, the second end 20 opposing the first end 11 of each leg 12. In a specific embodiment, legs 12 include a center portion 13 and a pair of round portions 15 positioned on either side of center portion 13 with a leg band or collar 17 coupling center portion 13 and round portions 15 at the second end 20 of legs 12. In such embodiments, center portion 13 is slidable relative to the round portions 15 such that the length of each leg is adjustable.

Figure 2:
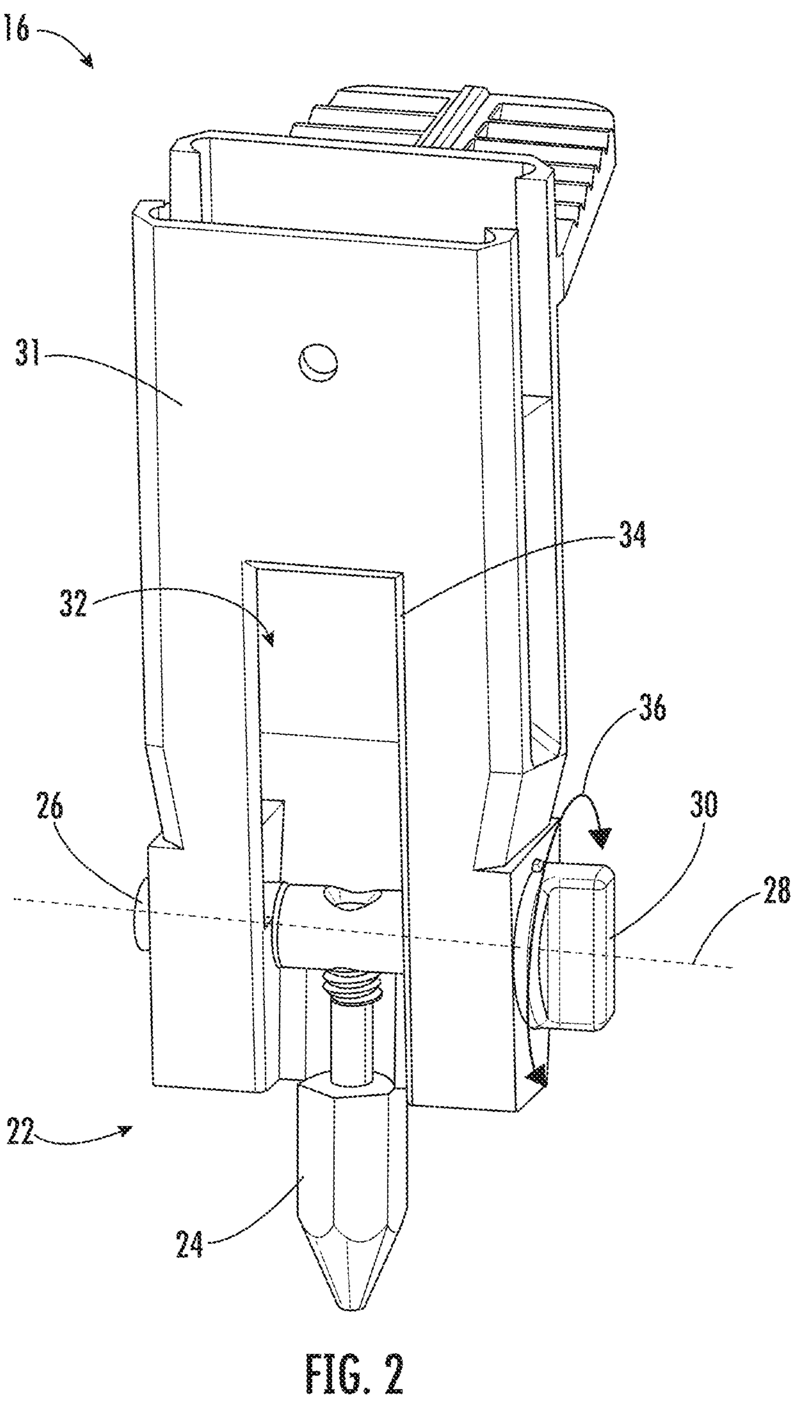
FIG. 2 is a detailed perspective view of a foot of the tripod, showing a foot spike assembly in an extended position, according to an exemplary embodiment.
Figure 3:
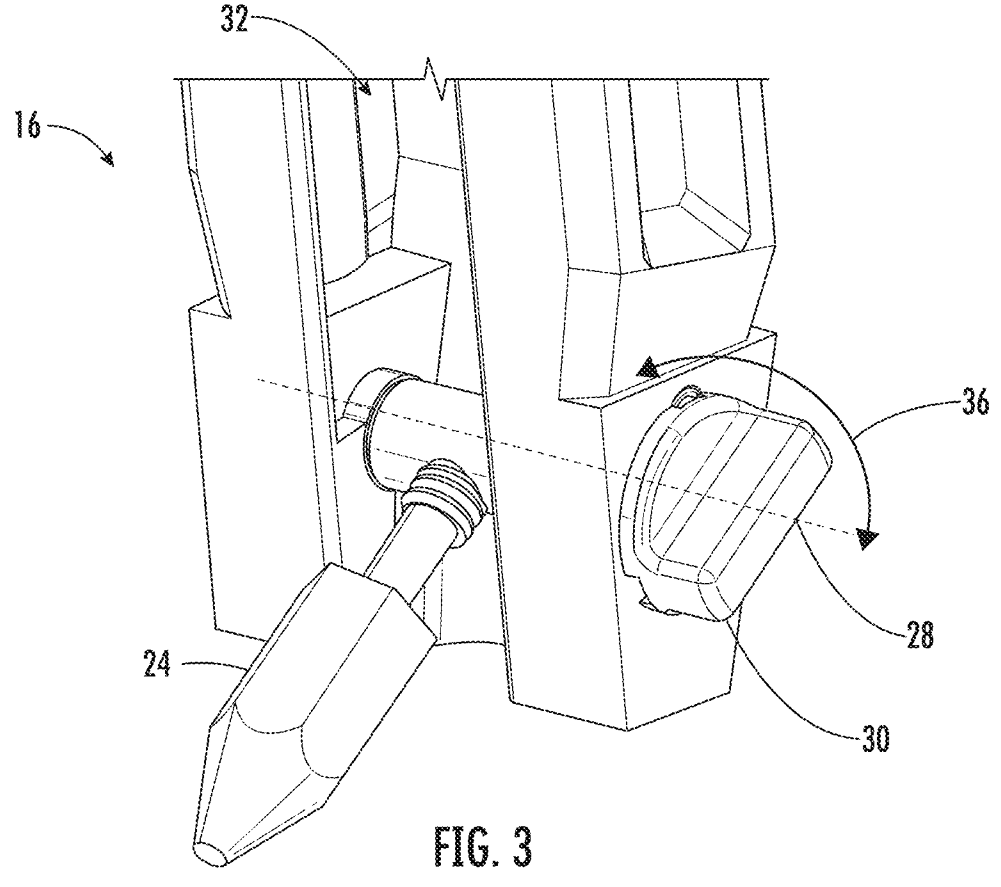
FIG. 3 is a detailed perspective view of the foot of FIG. 2, after rotation of the foot spike assembly part of the way to a closed position, according to an exemplary embodiment.
Figure 4:
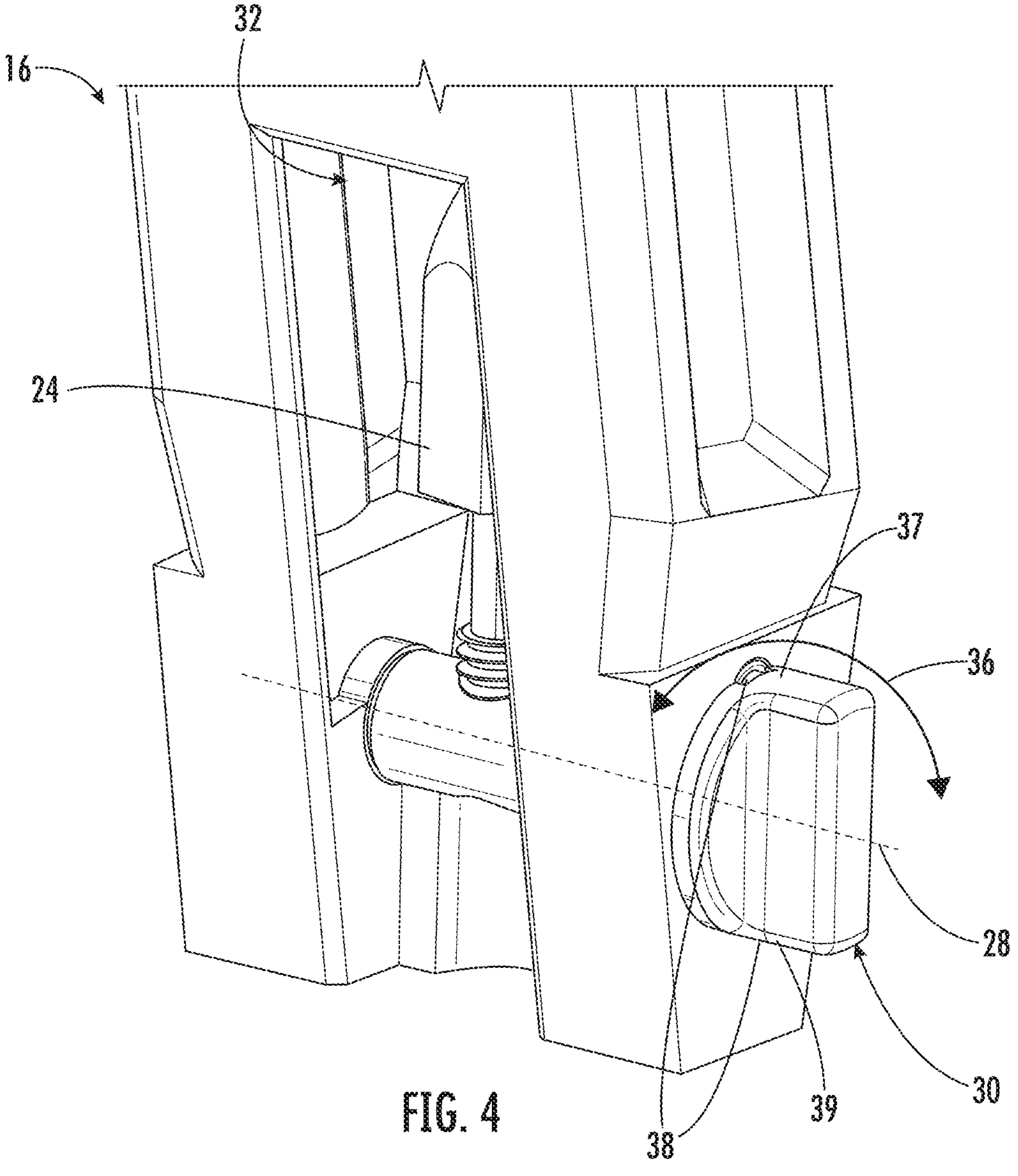
FIG. 4 is a detailed perspective view of the foot of FIG. 2, after rotation of the foot spike assembly to a third position, according to an exemplary embodiment.

Referring to FIGS. 2-4, various aspects of a foot 16 that can be utilized with a stand shown as tripod 10 are shown, according to an exemplary embodiment. Foot 16 includes a foot spike assembly 22. Foot spike assembly 22 includes a foot spike 24, a pin 26 extending along an axis 28, a knob 30 and a recess 32. Pin 26 extends along axis 28 in a generally perpendicular orientation relative to foot spike 24 and is generally perpendicular to a longitudinal axis of leg 12. Pin 26 includes first and second opposing ends. Foot spike 24 is rotatable about axis 28 where the rotation movement is represented by arrow 36. Foot 16 further includes an inner or rear surface 31 (i.e., surface is inward facing toward other legs 12 and/or feet 16) with an edge 34 defining recess 32 which is sized and/or shaped to receive foot spike 24. Recess 32 includes a major axis extending along longitudinal axis 18.

The rotational movement 36 about axis 28 shown from FIG. 2 to FIG. 4 demonstrates foot spike 24 is not at a fixed position relative to foot 16, allowing a user to turn knob 30 and position foot spike 24 as needed (e.g., in a first, extended position for outdoor use or in the third, hidden position for indoor use). When a user turns knob 30 in a first direction (i.e., clockwise in the orientation shown in FIGS. 2-4), the foot spike 24 rotates into a first position where the foot spike 24 is received within the foot 16 and specifically within the recess 32 such that the foot spike 24 becomes positioned and/or concealed within the foot 16. When a user turns knob 30 in a second direction (i.e., counterclockwise in the orientation shown in FIGS. 2-4), the foot spike 24 rotates into a second position where a tip of the foot spike 24 extends beyond the second end 11 of the leg 12 and out of a distal end of the recess 32 past the bottom surface 44 of the foot 16. In such an embodiment, foot spike 24 is configured to be securely planted into a soft ground surface to provide stability to the leg 12 and tripod 10.

Knob 30 includes a top portion 37 and a bottom portion 39. A locking mechanism, shown as spring detents 38 are positioned at the top portion 37 and bottom portion 39 of knob 30. Spring detents 38 hold the pin 26 and foot spike 24 in the first, extended position shown in FIG. 2 and the third, hidden or concealed position shown in FIG. 4.

Figure 5:
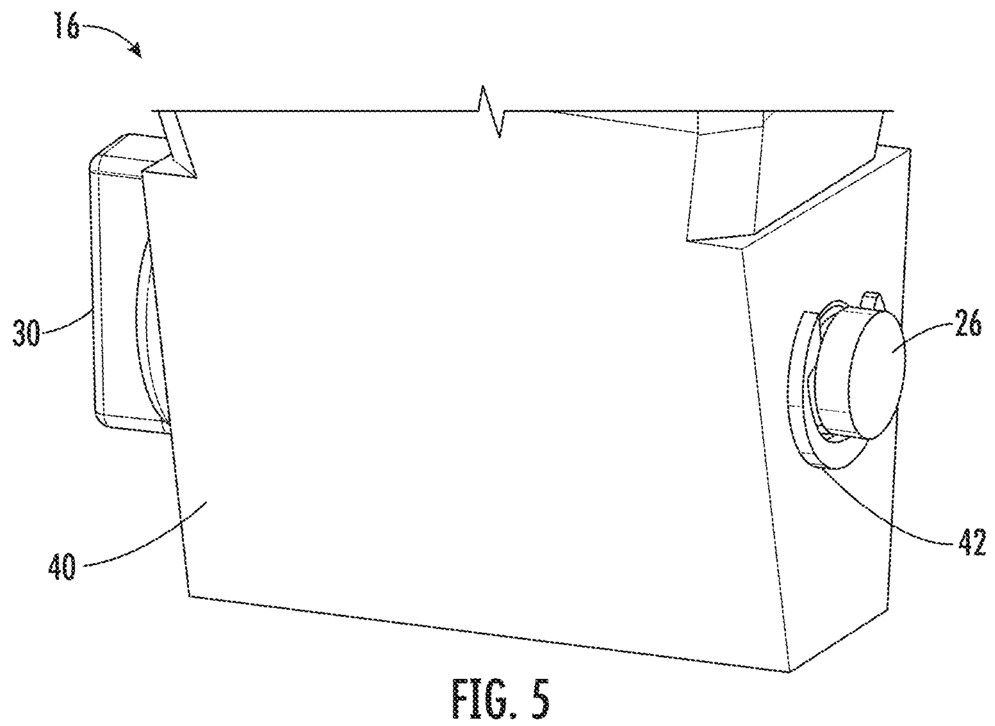
FIG. 5 is a detailed perspective view of the front of the foot of the tripod of FIG. 2, according to an exemplary embodiment.

Referring to FIG. 5, a detailed perspective view of the front of foot 16 is shown, according to an exemplary embodiment. Foot 16 further includes an outer or front surface 40 (i.e., surface is outward facing away from other legs 12 and/or feet 16) and a first and second opposing side surface. The first and second opposing side surfaces each extending between rear surface 31 and front surface 40. When the foot spike 24 is positioned within the recess 32 of the foot 16 such that the foot spike 24 is surrounded by the first and second opposing side surfaces of the foot 16 and the front surface 40 of foot 16.

Foot spike assembly 22 further includes a clip, shown as a c-clip 42 positioned to hold pin 26 in place. C-clip 42 is positioned along and/or against one of the opposing side surfaces of foot 16 and knob 30 is positioned along and/or against the other opposing side surface. One of the first and second opposing ends of pin 26 is coupled to knob 30 with the remaining of the first and second opposing ends coupled to C-clip 42.

Figure 6:
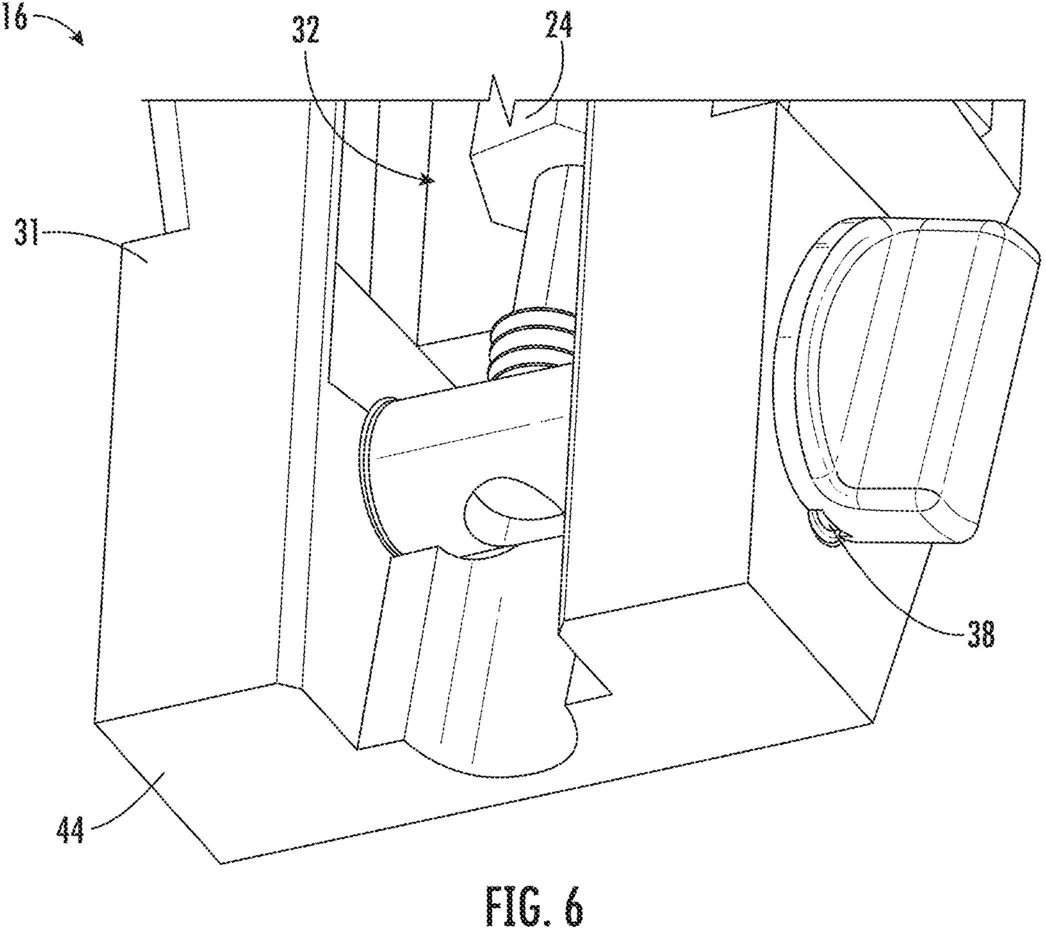
FIG. 6 is a detailed perspective view of the bottom of the foot of the tripod of FIG. 2, according to an exemplary embodiment.
Figure 7:
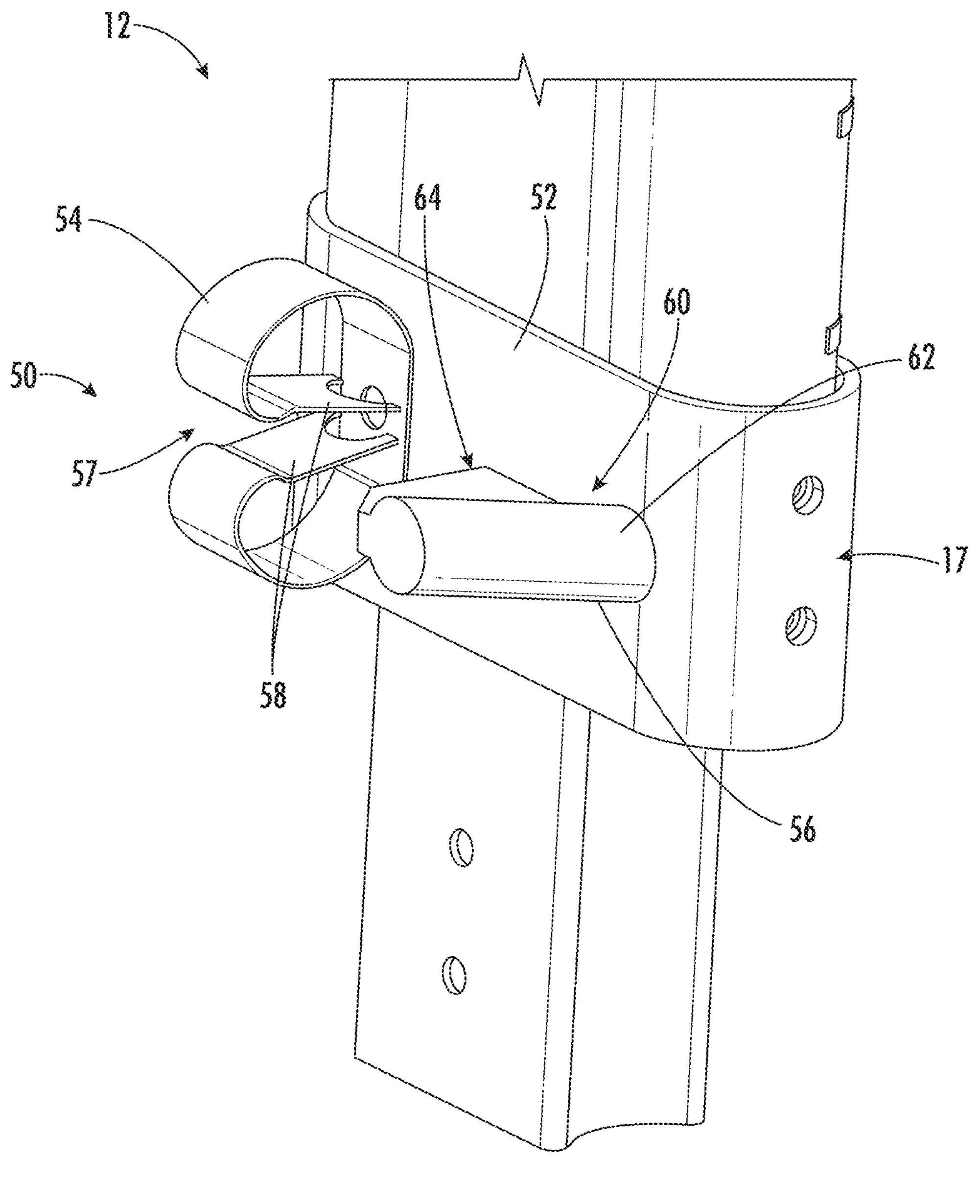
FIG. 7 is a detailed rear perspective view of a leg of the tripod, showing a leg retention assembly, according to an exemplary embodiment.

Referring to FIG. 6, a detailed perspective view of the bottom of foot 16 is shown, according to an exemplary embodiment. Foot spike 24 is received by recess 32 and is shown in the hidden position, ready for use in an indoor setting. Foot 16 further includes a bottom surface 44. In a specific embodiment, bottom surface 44 may have a rounded surface and/or be coupled to a pad (e.g., a rubber pad)

designed and/or configured to ensure each foot 16 does not scratch a floor during use of tripod 10. In a specific embodiment, bottom surface 44 is a planar surface.

Referring to FIGS. 7-21, various embodiments of devices for holding the legs of tripod 10 in a collapsed or storage position as shown in FIG. 1 are described. In general, each of the leg retention devices are coupled to one of the legs and includes an attachment device configured to attach to one of the adjacent legs such that legs are held in place in the collapsed position.

Referring to FIGS. 7-10, details of a leg retention assembly that can be utilized with tripod 10 are shown according to an exemplary embodiment. In general, stand or tripod 10 includes a leg retention assembly 50 with one or more leg retention or locking components shown as spring clips 54 and bars 56. Spring clip 54 and bar 56 are coupled to an inner surface 52 of a leg band or collar 17. In a specific embodiment, spring clip 54 includes a pair of retention surfaces 58 facing each other and positioned on either side of a gap 57. Bar 56 includes a generally cylindrical portion 60 having an outer surface 62 and a protruding portion 64 extending toward the spring clip 54 coupled to the same collar 17. Spring clip 54 is shaped to receive generally cylindrical portion 60 of bar 56 within gap 57 such that retention surfaces 58 can clamp or hold onto the outer surface 62 of bar 56. In a specific embodiment, spring clip 54 is formed from a metal such as steel. In other embodiments, the clips and bars may have other geometries (e.g. square, oval etc.) or be formed from other materials (e.g., plastic).

Figure 8:
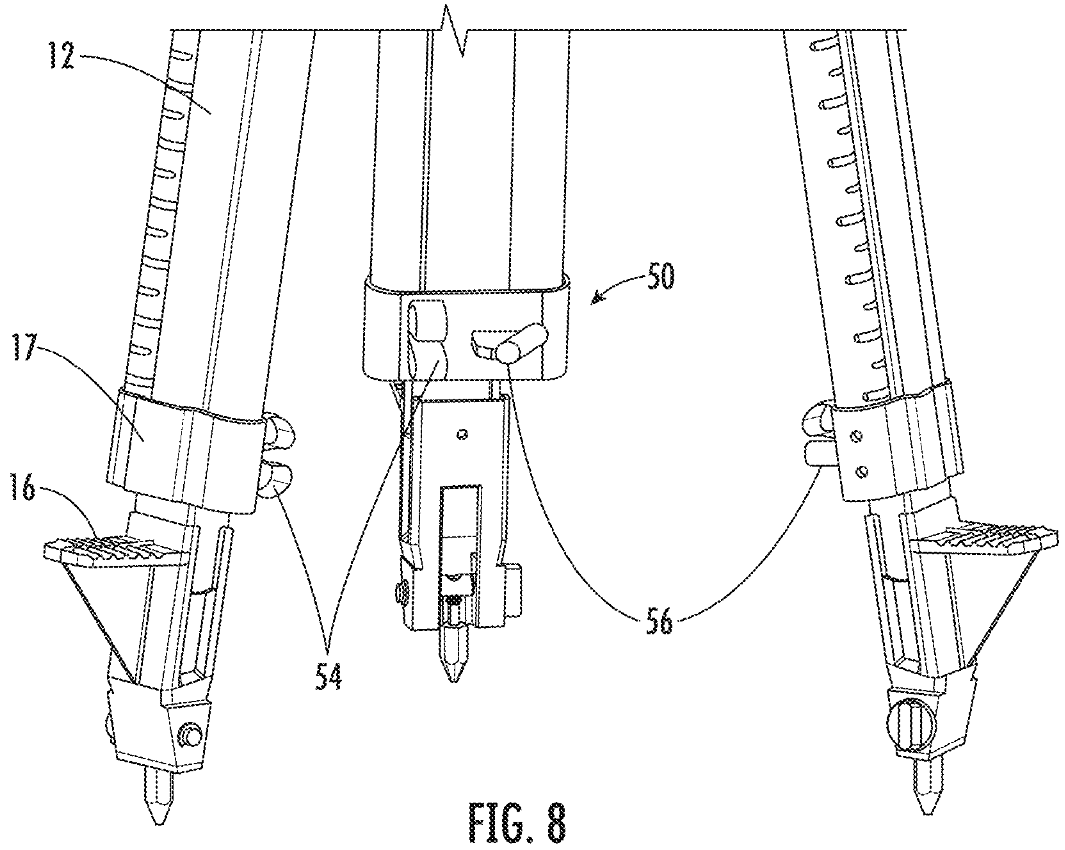
FIG. 8 is detailed perspective view of the leg retention assembly of FIG. 7, showing the leg retention assembly in a first, open position, according to an exemplary embodiment.
Figure 9:
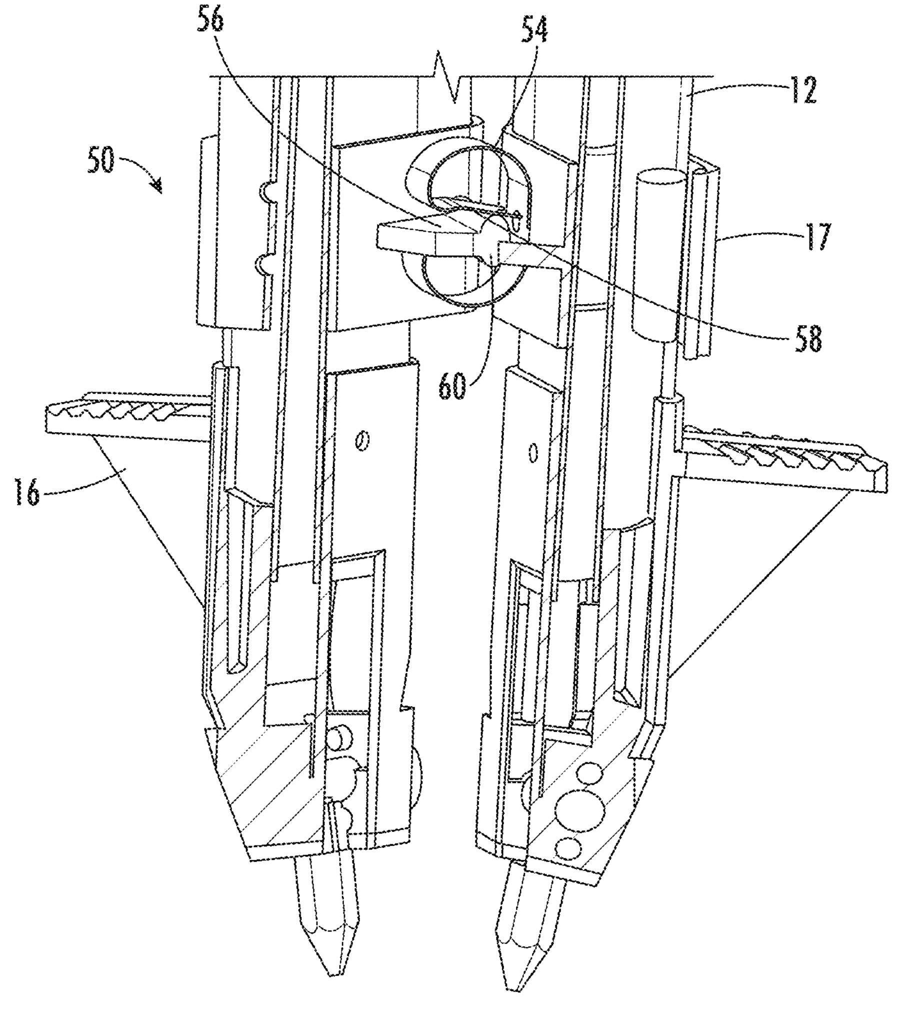
FIG. 9 is a cross-section of the leg retention assembly of FIG. 7, showing the leg retention assembly in a second, closed position, according to an exemplary embodiment.
Figure 10:
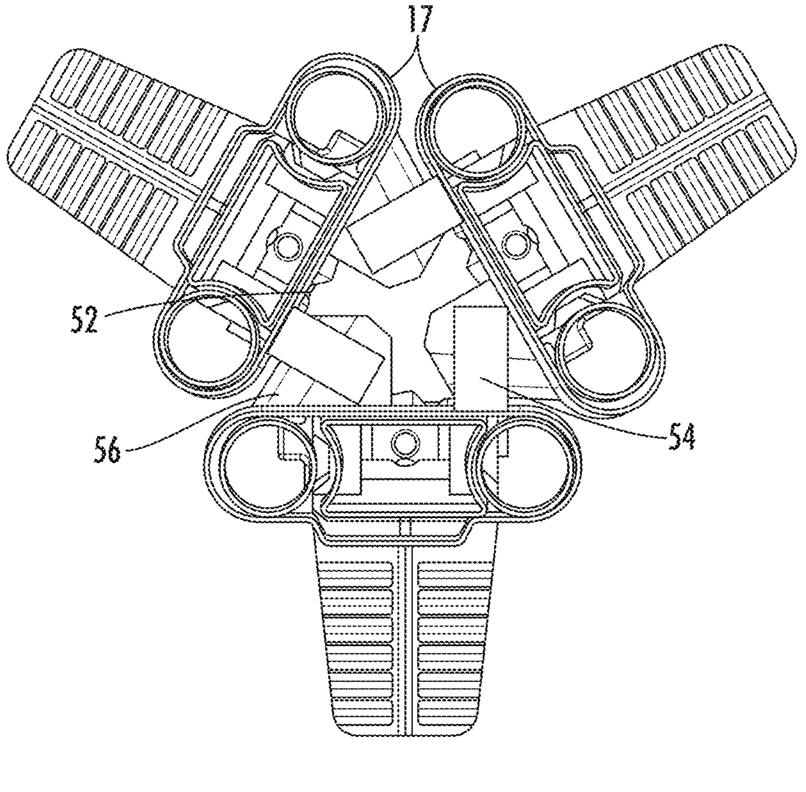
FIG. 10 is a detailed top perspective view of the leg retention assembly of FIG. 7, showing the leg retention assembly in a second, closed position, according to an exemplary embodiment.
Figure 11:
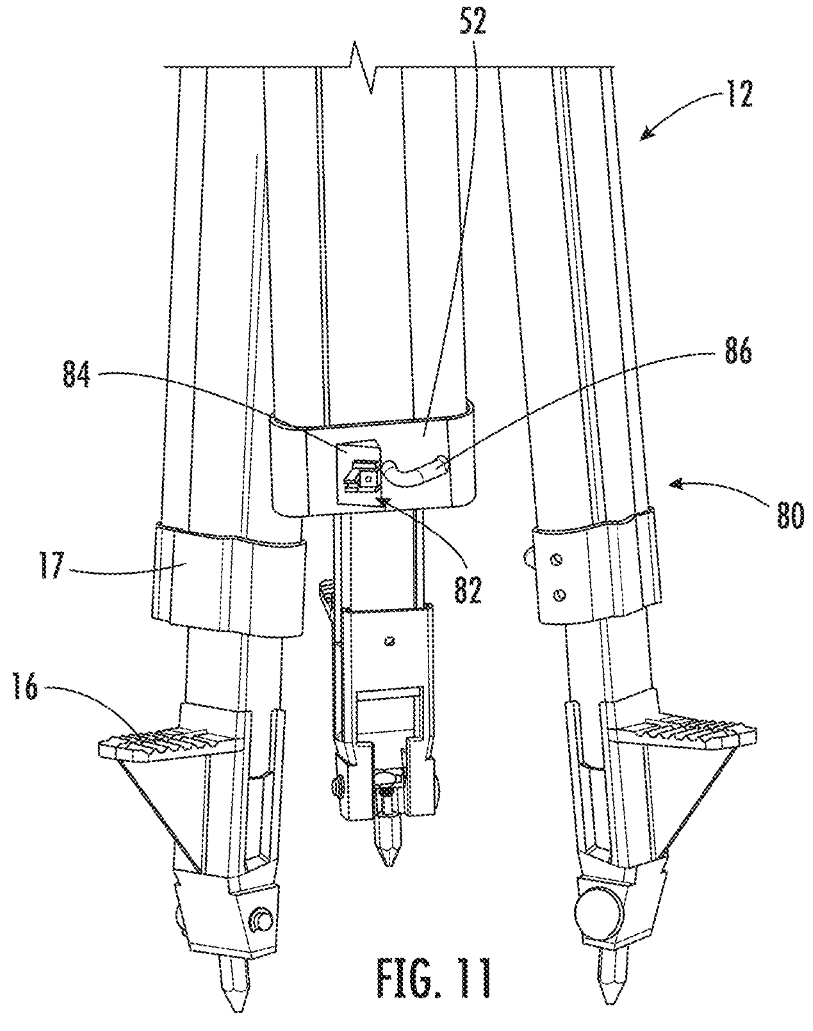
FIG. 11 is a detailed perspective view of a tripod with a leg retention assembly, showing the leg retention assembly in a first, open position, according to an exemplary embodiment.
Figure 12:
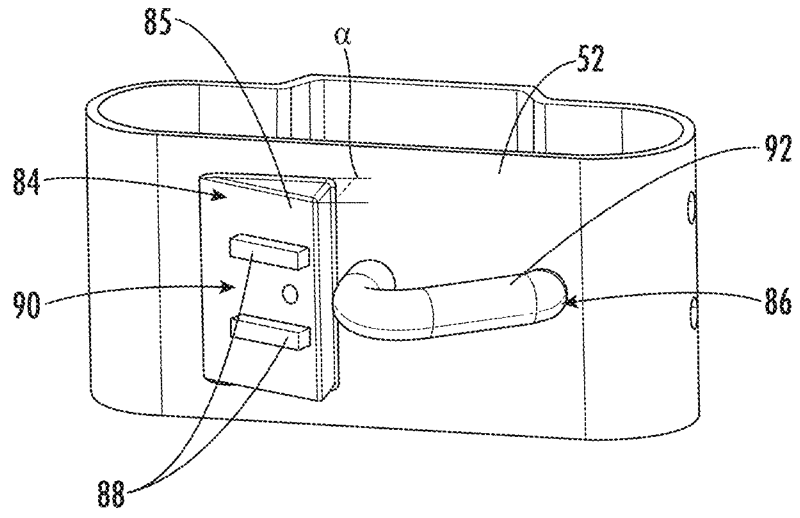
FIG. 12 is a detailed rear perspective view of the leg retention assembly of FIG. 11, according to an exemplary embodiment.

Referring to FIG. 8, a detailed perspective view of the leg retention assembly 50 is shown in an open or unlocked position. Referring to FIG. 9, a cross-section view of the leg retention assembly 50 is shown in a closed or locked position. FIG. 10 shows a perspective view of the leg retention assembly from above with all legs in a locked position, according to an exemplary embodiment.

Referring to FIGS. 11-14, another embodiment of a leg retention assembly that can be utilized with tripod 10 are shown according to an exemplary embodiment. In general, stand or tripod 10 includes a leg retention assembly 80 with one or more leg retention or locking components shown as clips 82 and bars 86. Leg retention assembly 80 further includes a plate 84 coupled to an inner surface 52 of a leg band or collar 17. Plate 84 includes an upper surface 85 positioned at an angle $\alpha$ relative to inner surface 52 of collar 17. In a specific embodiment, plate 84 is triangular prism and includes a pair of projections 88 extending away from plate 84 and inner surface 52 of collar 17 and defining a gap 90 between the pair of projections 88. In other embodiments, the plate and pair of projections may have different geometries (e.g., rectangular prism etc.).

Figure 13:
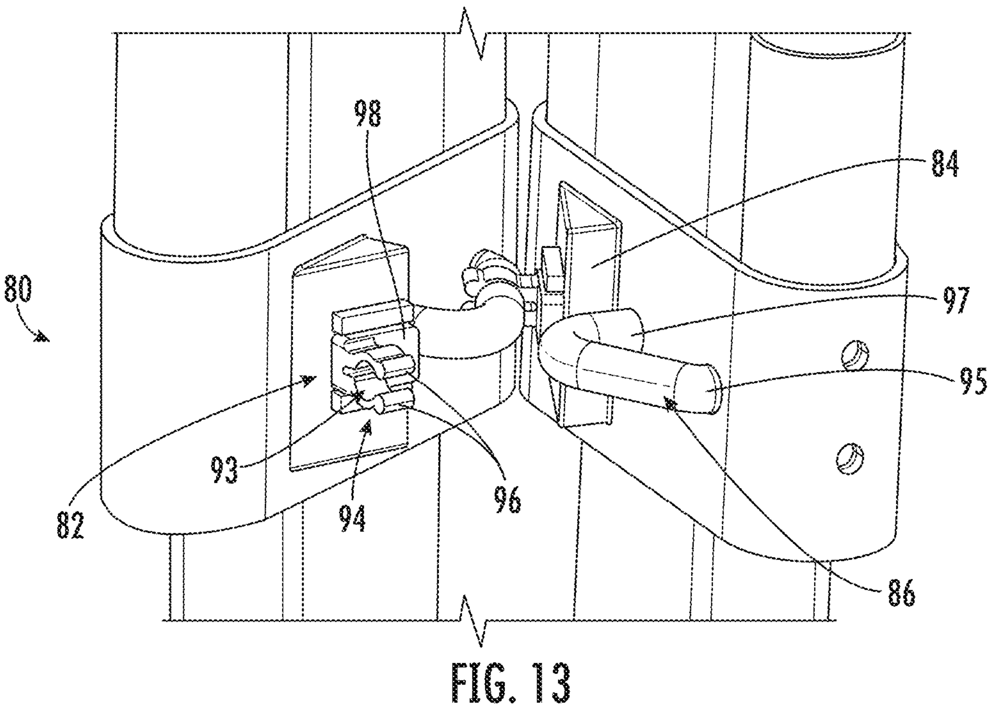
FIG. 13 is a detailed perspective view of the leg retention assembly of FIG. 11, showing the leg retention assembly in a second, closed position, according to an exemplary embodiment.
Figure 14:
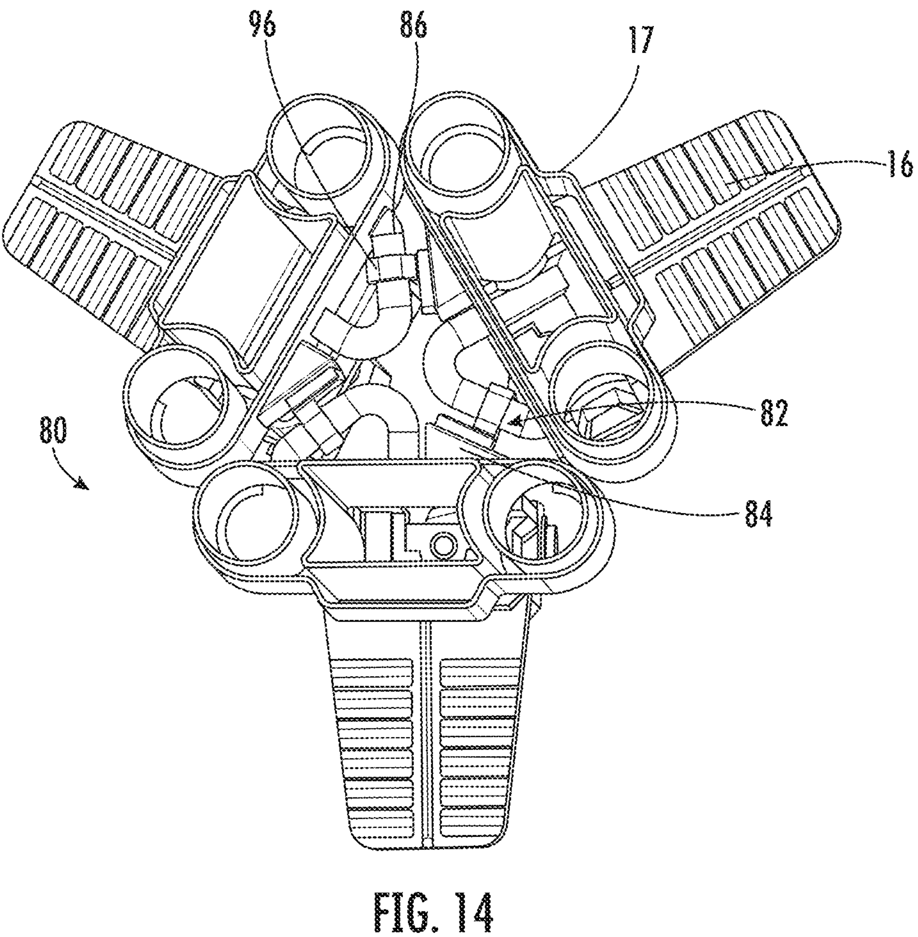
FIG. 14 is a detailed top perspective view of the leg retention assembly of FIG. 11, showing the leg retention assembly in a second, closed position, according to an exemplary embodiment.
Figure 15:
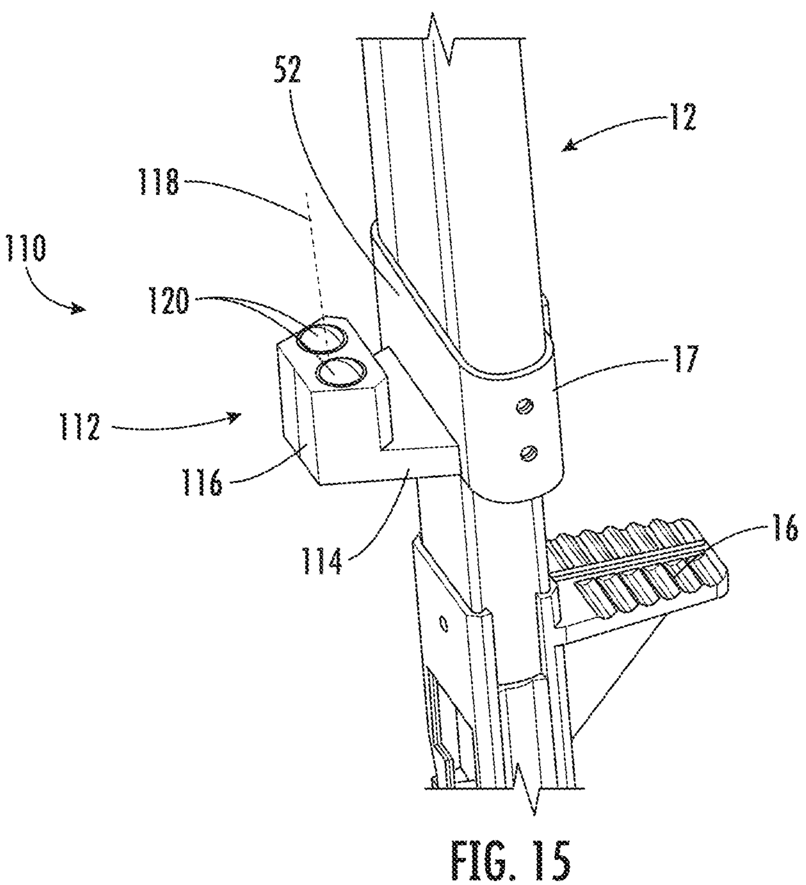
FIG. 15 is a detailed left side perspective view of a leg of a tripod, showing a leg retention assembly, according to an exemplary embodiment.
Figure 16:
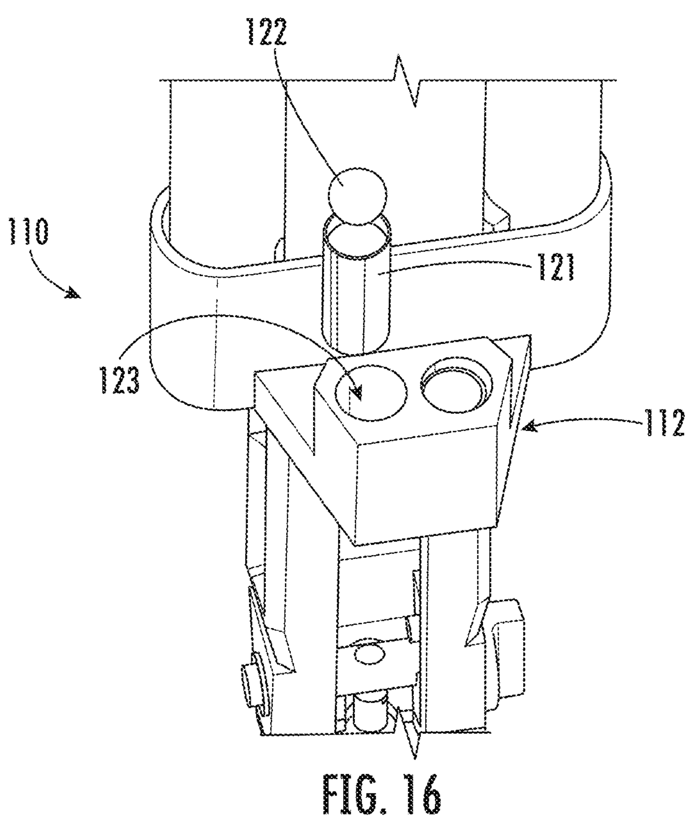
FIG. 16 is a partially exploded view from above of the leg retention assembly of FIG. 15, according to an exemplary embodiment.
Figure 17:
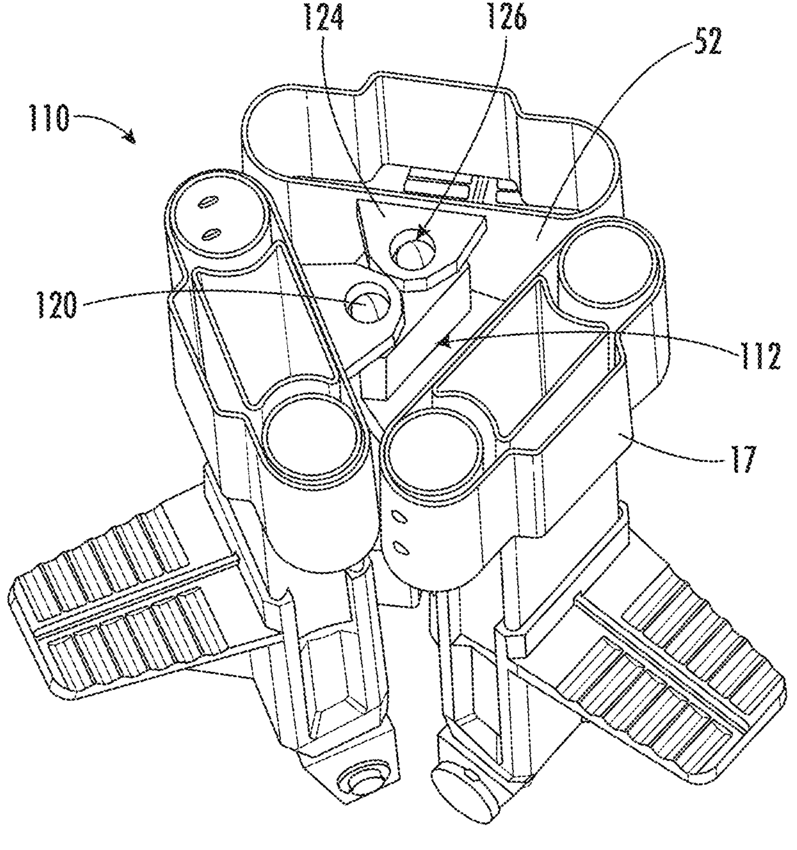
FIG. 17 is a detailed perspective view from above of the leg retention assembly of FIG. 15, showing the leg retention assembly in a close position, according to an exemplary embodiment.
Figure 18:
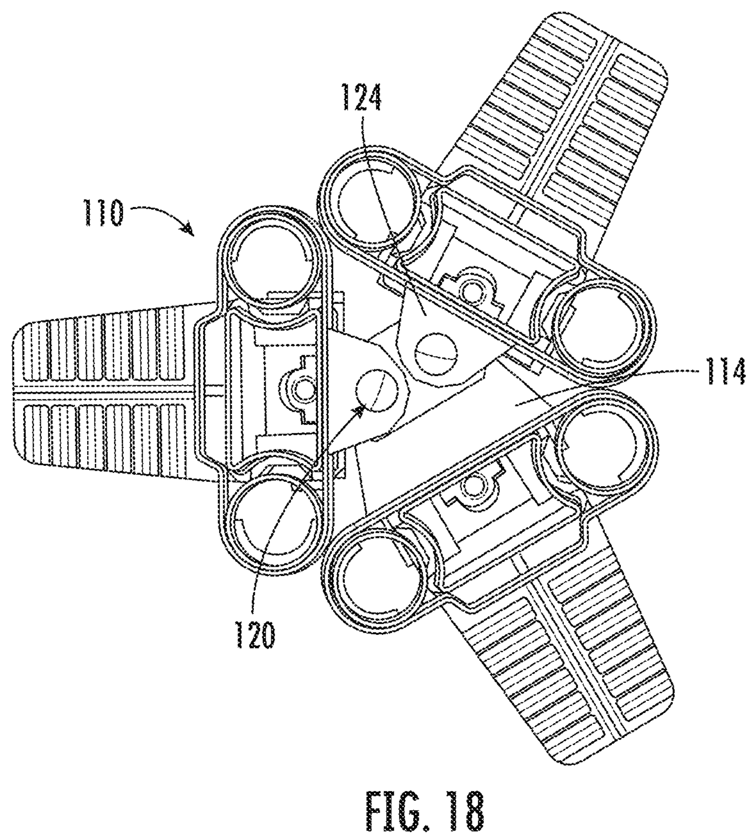
FIG. 18 is a detailed top perspective view of the leg retention assembly of FIG. 15, according to an exemplary embodiment.

Referring to FIG. 13, a detailed perspective view of the leg retention assembly 80 is shown in a closed or locked position. Clip 82 includes a grasping or clipping portion 94 and a body portion 98. Body portion 98 of clip 82 couples to plate 84 and is positioned in gap 90 between projections 88. Clipping portion 94 includes a pair of arms 96 shaped to receive bar 86 and extending away from body portion 98 with arms 96 defining a space 93. Bar 86 includes an outer surface 92. When tripod 10 is in a closed position, a bar 86 on an adjacent collar 17 is received within space 93 defined between arms 96 of clip 82 on a separate collar 17 such that arms 96 extend around the outer surface 92 of bar 86, securely clipping adjacent legs 12 together.

In a specific embodiment, bar 86 has an elbow shape and a generally circular cross-sectional shape. In other embodiments, bar 86 may have different geometries to correspond to the shape of arms 96. In a specific embodiment, clip 82 is formed from plastic. In other embodiments, clip 82 may be formed from other materials (e.g., metal).

Referring to FIGS. 15-18 another embodiment of a leg retention assembly that can be utilized with tripod 10 are shown according to an exemplary embodiment. In general, stand or tripod 10 includes a leg retention assembly 110 with one or more leg retention or locking components shown as a spring detent housing 112 coupled to one of legs 12, a spring detent system 120 and a pair of collars 124 each having an aperture or detent capture 126 on the other two legs 12.

In a specific embodiment, spring detent housing 112 includes an arm 114 coupled to inner surface 52 of collar 17 and extending in a generally perpendicular (±3 degrees) orientation from inner surface 52. Spring detent housing 112 further includes a projection 116 extending in a direction of axis 118, where axis 118 is generally parallel (±3 degrees) to inner surface 52. Projection 116 includes a pair of cylindrical channels 123 extending in a parallel manner relative to axis 118 and sized to receive the spring detent system 120. Spring detent system 120 includes a spring 121 and a spherical component shown as ball bearing 122. Each collar 124 has a generally perpendicular (±3 degrees) orientation from inner surface 52 and is positioned at a vertical position a greater distance from foot 16 compared to arm 114. Collars 124 each include detent captures 126 to maintain the position of ball bearings 122 holding the legs 12 in a closed or locked position (see e.g. FIGS. 17 and 18). In other embodiments, a spring and pin mechanism could be used, where the spring could be manually pulled down to increase the holding force of leg retention assembly 110.

Figure 19:
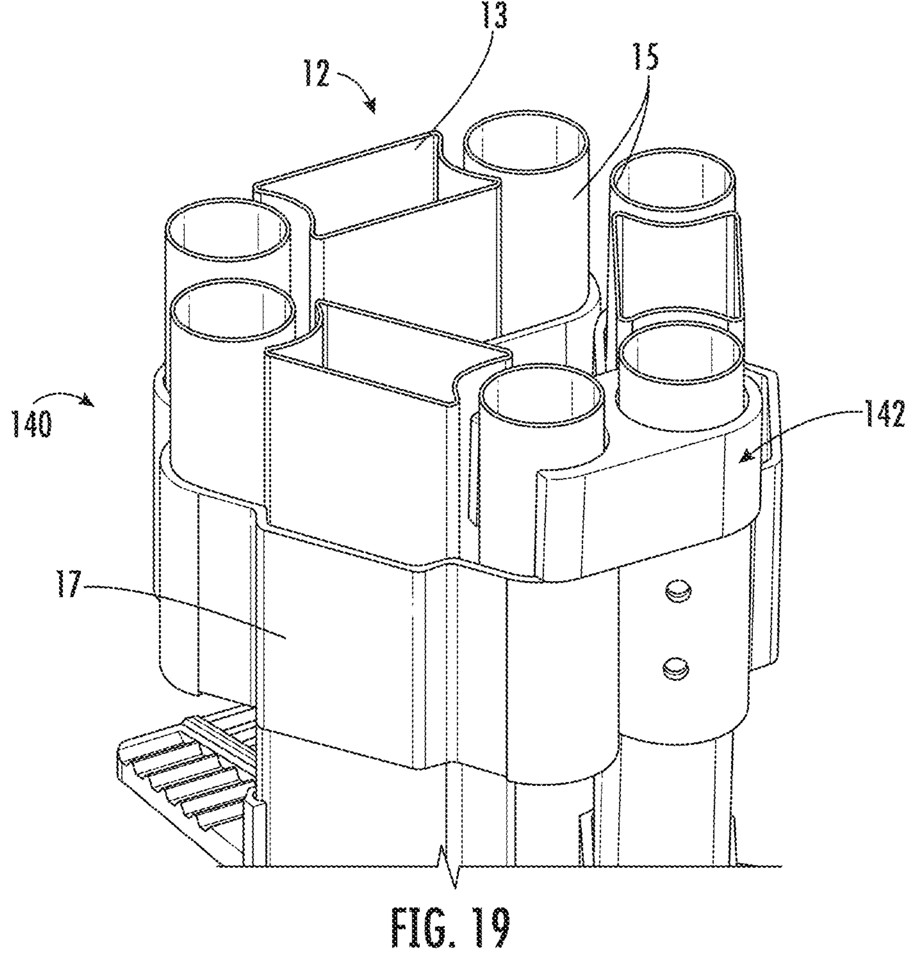
FIG. 19 is a detailed front perspective view of a tripod with a leg retention assembly, showing the leg retention assembly in a closed position, according to an exemplary embodiment.
Figure 20:
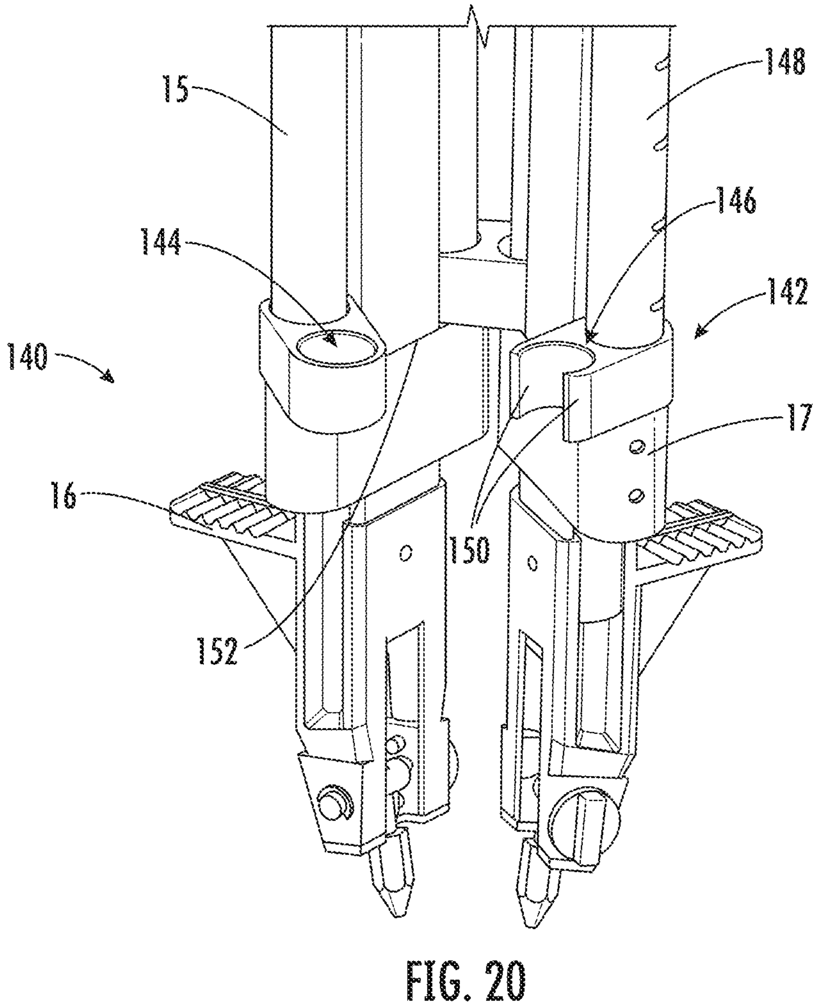
FIG. 20 is a detailed perspective view of the leg retention assembly of FIG. 18, showing the leg retention assembly in a closed position, according to an exemplary embodiment.
Figure 21:
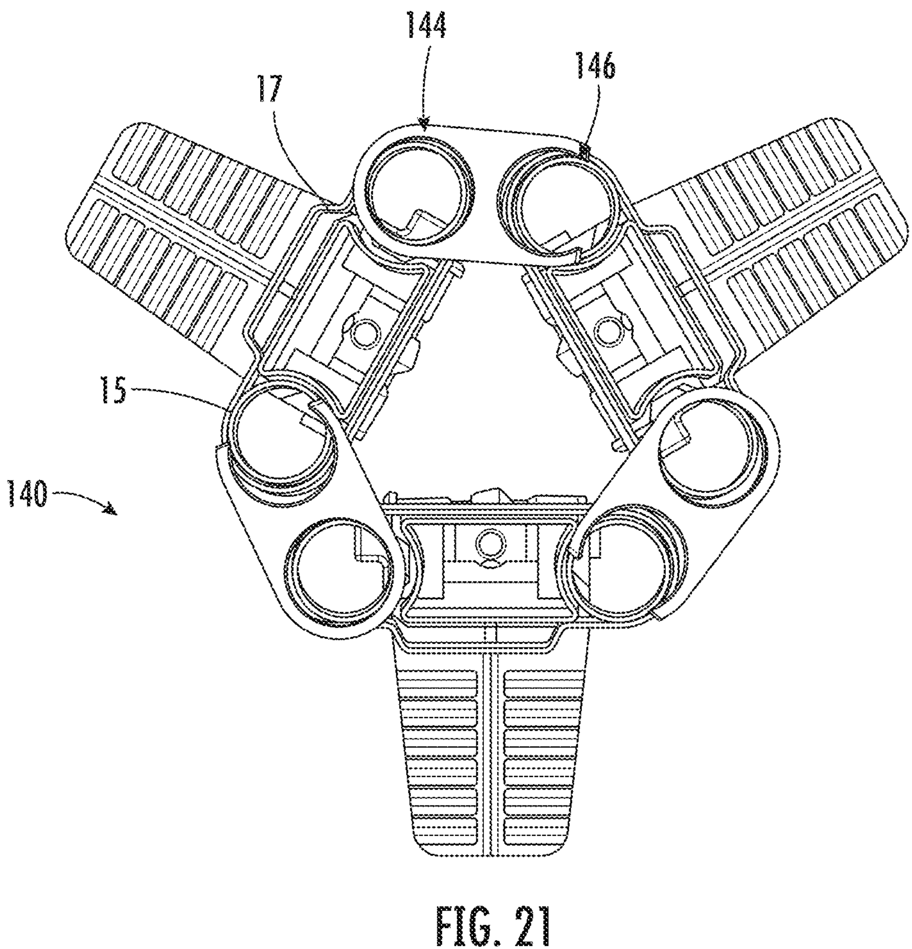
FIG. 21 is a detailed top perspective view of the leg retention assembly of FIG. 18, according to an exemplary embodiment.

Referring to FIGS. 19-21, another embodiment of a leg retention assembly that can be utilized with tripod 10 are shown according to an exemplary embodiment. In general, stand or tripod 10 includes a leg retention assembly 140 with one or more leg retention or locking components shown as extrusion clips 142. Extrusion clips 142 include a circular channel 144 and a clip portion 146 with arms 150. Extrusion clip 142 and specifically circular channel 144 slidably connects to one of the round portions 15 of leg 12, surrounding a portion of an outer surface 148 of round portion 15. Extrusion clips 142 are positioned at a top edge 152 of collar 17 and fixed in that position with a fastener such as a screw. Clip portion 146 and arms 150 clip or hold onto an adjacent round portion 15 of a different leg 12 in a closed or locked position. In a specific embodiment, extrusion clip 142 is formed from a plastic material. In other embodiments, extrusion clip may be formed from a different material (e.g. metal).

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed:

1. A support structure for a laser projection device, comprising:

a platform, the platform including a mount configured to securely engage a laser projection device;

a plurality of legs movable between an open position and a closed position, the plurality of legs arranged around a longitudinal axis extending through the platform, each leg of the plurality of legs, comprising:

a first end coupled to the platform;

a second end opposing the first end; and a foot coupled to the second end; and a plurality of leg retention devices, each leg retention device coupled to a respective leg of the plurality of legs and configured to attach to an adjacent leg when the plurality of legs is moved into the closed position such that the plurality of legs is held together in the closed position, each leg retention device comprising a collar, a first locking component coupled to an inner surface of the collar, and a second locking component coupled to the inner surface of the collar, wherein the inner surface faces towards the longitudinal axis.

2. The support structure of claim 1, wherein the first locking component is a clip and wherein the second locking component is a bar, wherein the clip is configured to hold the bar of the leg retention device of the adjacent leg.

3. The support structure of claim 2, wherein the clip of each leg retention device comprises a pair of retention surfaces facing each other and separated by a gap, wherein, when the bar of the adjacent leg is positioned within the gap, the pair of retention surfaces engage with an outer surface of the bar.

4. The support structure of claim 3, wherein the bar of each leg retention device includes a cylindrical portion positioned within the gap of the adjacent leg when the plurality of legs is in the closed position.

5. The support structure of claim 2, wherein each leg retention device further comprises a plate coupled to the inner surface of the collar, wherein the clip is coupled to the plate.

6. The support structure of claim 5, wherein each leg retention device further comprises a pair of projections extending away from the plate and the inner surface of the collar, wherein the pair of projections define a gap, and wherein the clip is positioned within the gap.

7. The support structure of claim 5, wherein the plate of each leg retention device is a triangular prism such that the plate defines a non-zero angle relative to the inner surface of the collar.

8. A stand for a laser level, comprising:

a platform;

a plurality of legs comprising a first leg and a second leg, wherein each leg of the plurality of legs comprises:

a first end coupled to the platform;

a second end opposing the first end; and a foot coupled to a respective leg at the second end;

a longitudinal axis extending through the platform, the plurality of legs arranged around the longitudinal axis; and a leg retention device configured to hold the plurality of legs in a collapsed position, the leg retention device comprising:

a first locking component coupled to a first inner surface of the first leg, the first inner surface facing towards the longitudinal axis; and a second locking component coupled to a second inner surface of the second leg, the second inner surface facing towards the longitudinal axis.

9. The stand of claim 8, wherein each foot comprises:

a foot spike extending along the longitudinal axis;

a recess defined within the respective foot, the recess sized to receive the foot spike;

a pin aligned with an axis of rotation, the pin coupled to the foot spike; and a knob coupled to the pin, wherein the foot spike is rotatable about the axis of rotation when the knob is rotated between an extended position in which the foot spike extends beyond the second end of the respective leg and a closed position in which the foot spike is located within the recess.

10. The stand of claim 9, wherein each pin further includes a first opposing end and a second opposing end, wherein the first opposing end of each pin is coupled to a respective knob and the second opposing end of each pin is coupled to a respective clip.

11. The stand of claim 8, wherein a collar is coupled to the first leg, wherein the first locking component is coupled to the collar, the first locking component comprising:

a housing;

a channel formed in the housing; and a spring detent system positioned within the channel; and wherein the second locking component is a detent capture;

wherein, when in the plurality of legs are in the collapsed position, at least a portion of the spring detent system is received in the detent capture.

12. The stand of claim 11, wherein the spring detent system comprises a spring and a ball bearing, wherein the detent capture maintains the positioning of the ball bearing to hold the plurality of legs in the collapsed position.

13. The stand of claim 11, wherein the plurality of legs further comprises a third leg, wherein the channel is a first channel and the housing further comprises a second channel formed in the housing, wherein the spring detent system is a first spring detent system positioned within the first channel, wherein the detent capture is a first detent capture coupled to the second leg, wherein the leg retention device further comprises:

a second spring detent system positioned within the second channel; and a second detent capture coupled to the third leg;

wherein, when in the plurality of legs are in the collapsed position, at least a portion of the first spring detent system is received in the first detent capture and at least a portion of the second spring detent system is received in the second detent capture.

14. A stand for a laser level, comprising:

a platform;

a plurality of legs movable between an open position and a closed position, each leg of the plurality of legs comprising a first end coupled to the platform and a second end opposing the first end;

a longitudinal axis extending through the platform, the plurality of legs arranged around the longitudinal axis;

a first leg retention device coupled to a first leg of the plurality of legs, the first leg retention device comprising:

a first collar positioned around the first leg;

a first bar coupled to an inner surface of the first collar; and a first clip coupled to the inner surface of the first collar; and a second leg retention device coupled to a second leg of the plurality of legs, the second leg retention device comprising:

a second collar positioned around the second leg;

a second bar coupled to an inner surface of the second collar; and a second clip coupled to the inner surface of the second collar;

wherein the first clip is configured to hold the second bar such that the plurality of legs is held in the closed position.

15. The stand of claim 14, wherein the first clip comprises a pair of retention surfaces facing each other and separated by a gap, wherein, when in the closed position, the second bar is positioned within the gap and the pair of retention surfaces engage with an outer surface of the second bar.

16. The stand of claim 14, wherein the first leg retention device further comprises a plate coupled to the inner surface of the first collar, the plate defining a non-zero angle relative to the inner surface of the first collar, wherein the first clip is coupled to the plate.

17. The stand of claim 14, wherein each leg of the plurality of legs further comprises a foot coupled to the second end of each respective leg of the plurality of legs, each foot comprising:

a foot spike extending along the longitudinal axis;

a first and second opposing side surfaces;

a pin aligned with an axis of rotation, the pin coupled to the foot spike and extending between the first and second opposing side surfaces; and a knob coupled to the pin, the knob positioned along one of the first and second opposing side surfaces of the respective foot;

wherein the foot spike is rotatable about the axis of rotation.

* * * * *